(12) United States Patent
Martinez Canedo

(10) Patent No.: US 12,115,680 B2
(45) Date of Patent: Oct. 15, 2024

(54) COMPUTERIZED ENGINEERING TOOL AND METHODOLOGY TO DEVELOP NEURAL SKILLS FOR A ROBOTICS SYSTEM

(71) Applicant: Siemens Aktiengesellschaft, Munich (DE)

(72) Inventor: Arquimedes Martinez Canedo, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 17/775,997

(22) PCT Filed: Dec. 3, 2019

(86) PCT No.: PCT/US2019/064219
§ 371 (c)(1),
(2) Date: May 11, 2022

(87) PCT Pub. No.: WO2021/112825
PCT Pub. Date: Jun. 10, 2021

(65) Prior Publication Data
US 2022/0379476 A1 Dec. 1, 2022

(51) Int. Cl.
*B25J 9/16* (2006.01)
*G05B 13/02* (2006.01)

(52) U.S. Cl.
CPC .......... *B25J 9/1671* (2013.01); *B25J 9/161* (2013.01); *G05B 2219/39001* (2013.01); *G05B 2219/39271* (2013.01)

(58) Field of Classification Search
None
See application file for complete search history.

(56) References Cited

U.S. PATENT DOCUMENTS 5,467,265 A 11/1995 Yamada et al.
9,671,777 B1 * 6/2017 Aichele .................. B25J 9/1666
(Continued)

FOREIGN PATENT DOCUMENTS

CN 103878772 A 6/2014
CN 107656615 A 2/2018
(Continued)

OTHER PUBLICATIONS

International Search Report corresponding to PCT application No. PCT/US2019/064219; 6 Pages.
(Continued)

*Primary Examiner* — Jaime Figueroa
*Assistant Examiner* — Atticus A Cameron

(57) ABSTRACT

Computerized engineering tool and methodology to develop neural skills for computerized autonomous systems, such as a robotics system (50), are provided. A disclosed computerized engineering tool (10) may involve an integrated arrangement of respective modular functionalities arranged in a closed loop, such as may include a physics engine (14), a neural data editor (16), an experiment editor (18), a neural skills editor (20), and a machine learning environment (22). Disclosed embodiments are conducive to cost-effectively simplifying development efforts involving neural skills, such as by reducing the time involved to develop the neural skills involved in any given robotics system and by reducing the level of expertise involved to develop neural skills.

14 Claims, 3 Drawing Sheets

(56) References Cited

U.S. PATENT DOCUMENTS

| | | | |
|---|---|---|---|
| 10,402,731 | B1 | 9/2019 | Cosic |
| 11,897,134 | B2 * | 2/2024 | Miller .................... G05B 13/04 |
| 2008/0262810 | A1 | 10/2008 | Moran et al. |
| 2019/0126472 | A1 * | 5/2019 | Tunyasuvunakool ... G06N 3/08 |
| 2019/0251477 | A1 | 8/2019 | Crosta et al. |
| 2019/0314984 | A1 | 10/2019 | Gonzalez Aguirre et al. |
| 2019/0370659 | A1 | 12/2019 | Dean et al. |
| 2021/0162589 | A1 * | 6/2021 | Tan .......................... G06N 3/08 |

FOREIGN PATENT DOCUMENTS

| | | | |
|---|---|---|---|
| CN | 107894715 | A | 4/2018 |
| CN | 108319456 | A | 7/2018 |
| CN | 108333941 | A | 7/2018 |
| CN | 109635918 | A | 4/2019 |
| CN | 110366734 | A | 10/2019 |
| CN | 110515760 | A | 11/2019 |
| JP | 2019040421 | A | 3/2019 |
| RU | 2694846 | C1 | 7/2019 |
| WO | 2019083336 | A1 | 5/2019 |
| WO | 2019113067 | A2 | 6/2019 |
| WO | 2019209681 | A1 | 10/2019 |

OTHER PUBLICATIONS

Feng Chi Sun et al:; "Review on the achievements in simultaneous localization and mapping for mobile robot based on vision sensor"; Publish date: Apr. 15, 2010.

* cited by examiner

FIG. 3

```
                                                                    ┌─ 122
┌────────────────────────────────────────────────────────────────────┐
│  Analyzing by an analyzer of the computerized engineering tool, the statistical │
│  properties extracted from the machine learning environment, the analyzing │
│  configured to determine whether the learned neural skills fulfill desired objectives │
└────────────────────────────────────────────────────────────────────┘
```

FIG. 4

If the analyzing determines the learned neural skills fulfill the desired objectives, using a skills composer to compose programmed skills comprising the learned neural skills and handcrafted skills configured to implement at least further parts of the control policy — 132

FIG. 5

Inputting the programmed skills to a code generator configured to generate computer-readable code suitable for execution by a robotics controller of the robotics system to implement the control policy — 142

FIG. 6

If the analyzing determines the learned neural skills do not fulfill the desired objectives, performing at least one iteration in the closed loop to make at least one of the following adjustments:
an adjustment by the physics engine to at least one of the plurality of data primitives;
an adjustment by the neural data editor to a selecting of respective data sets of user-selectable data elements displayed by the neural data editor;
an adjustment by the experiment editor to prepare adjusted parameter data for the desired experiment case;
an adjustment to the defined neural network — 152

FIG. 7

Coupling the computerized engineering tool to a meta-learning optimizer, which is configured to optimize at least one of the respective modular functionalities by one integrated arrangement — 162

COMPUTERIZED ENGINEERING TOOL AND METHODOLOGY TO DEVELOP NEURAL SKILLS FOR A ROBOTICS SYSTEM

This application is a national phase filing under 35 U.S.C. § 371 of International Patent Application No. PCT/US2019/064219, filed Dec. 3, 2019, which is incorporated herein by reference in its entirety.

BACKGROUND

1. Field

Disclosed embodiments relate generally to the field of computerized engineering tools, and, more particularly, to computerized engineering tool and methodology to develop neural skills for computerized autonomous systems, such as robotics systems.

2. Description of the Related Art

Currently, skills implemented by a robotics system may be handcrafted (e.g., programmed by way of a suitable programming language, such as an IEC 61131-3 programming language, that may be used to implement a control program, for example, in a programmable logic controller (PLC)); or such skills may be learned using machine learning techniques, such as by way of a neural network.

Development of handcrafted skills may typically involve a core technical skill, such as may be carried out by a robotics expert. Development efforts involving this core technical skill may be time consuming. Development of neural skills tend to be relatively more complex and typically involve both a robotics expert and a deep learning expert. Consequently, development efforts involving neural skills become even more time consuming compared to development of handcrafted skills, such as due to data gathering and neural network design, training, and tuning. Accordingly, there is a need to simplify development efforts involving neural skills, e.g., reducing the time involved to develop the neural skills involved in any given robotics system. Additionally, it is desirable to reduce the level of expertise involved to develop neural skills.

BRIEF DESCRIPTION OF THE DRAWINGS

FIGS. 3-7 respectively illustrate further non-limiting details in connection with the disclosed methodology for developing neural skills for the robotics system.

DETAILED DESCRIPTION

Figure 1:
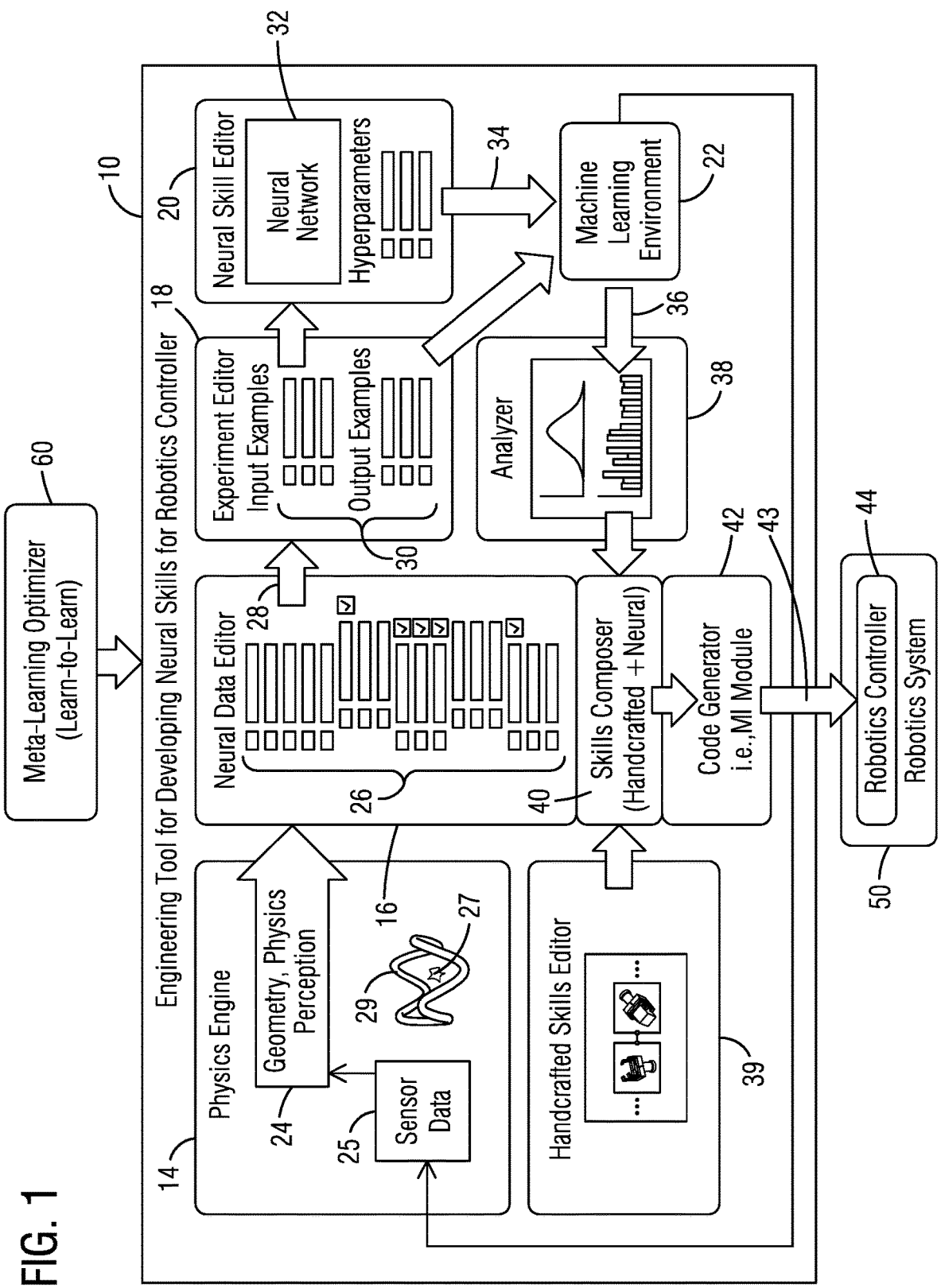
FIG. 1 illustrates a block diagram of one non-limiting embodiment of a disclosed computerized engineering tool that may be configured to develop neural skills for a robotics system, as may involve one or more robots that, for example, may be used in industrial applications involving autonomous control.

The present inventor has recognized that since development of neural skills has typically involved at least two distinct technical disciplines (e.g., robotics, and machine learning). These distinct technical disciplines generally involve two different expert functional roles (although a single person theoretically could perform the two roles) requiring different and time-consuming conceptualizations.

For example, under a typical prior art approach, to appropriately determine what the neural skills should be in order to appropriately manipulate an object—for example, "pick & place", "screw", "grasp", etc.—the robotics expert initially designs an experiment to generate data suitable for the machine learning expert. The machine learning expert, on the other hand, is tasked with designing a neural network based on interactions with the robotics expert. It will be appreciated that continuous and meaningful interaction between the experts is necessary because, for example, the designed experiment should generate appropriate data for the neural network, and therefore the data should appropriately match the characteristics of the neural network, such as in terms of type, input/output parameters, etc.

On the robotics expert side, the designed experiment may be run in either a simulated or in a real-world environment by way of a physics engine. Therefore, the robotics expert should also (i) write the code to extract data from the designed experiment, and (ii) develop or implement the data generation environment. The robotics expert should also develop the test environment to measure and validate the performance and behavior of the neural skills. When these components are ready, the experiment is executed one or several times, and data is generated.

On the machine learning expert side, the design of the neural network architecture is then implemented using an appropriate neural network code. After the training and test data become available, such as from the experiment conducted in the physics engine, the neural network is trained. The machine learning expert then tests the performance of the neural network and determines whether the achieved performance is enough to meet desired objectives. If the neural network training achieves satisfactory results, then the neural network can be deployed in a real-world application as a neural skill.

If the neural network training does not achieve satisfactory results, the foregoing process is repeated. That is, there must be further interaction between the two experts to do appropriate adjustments and re-execute the entire process again. In actual practice, the foregoing prior art process may typically involve several iterations and therefore such a process tends to be time consuming and burdensome. By way of example, a prior art process for developing a neural skill to perform inverse kinematics for a robot may take several weeks.

At least in view of the foregoing considerations, disclosed embodiments realize appropriate improvements for more effectively developing neural skills. Without limitation, a disclosed computerized engineering tool eliminates a need to develop (e.g., in code) the data generation environment, and the code to extract the data. Instead, a disclosed engineering tool effectively allows a user to, for example, directly interact with a virtual world in a physics engine. Thus, the robotics expert can design the experiment directly with the objects in the real world and can make use of appropriate data primitives, such as may be indicative of applicable geometry, physical interactions, and perception data. This, for example, allows efficiently formulating parameters (e.g., red, green, and blue (RGB) imagery, depth perception, plane segmentation) of imaging devices (e.g., cameras) that may be used, and thus effectively creating different robots with different geometries, and defining physical characteristics of objects to be manipulated in the real world, such as may involve forces, accelerations, velocities, impacts, etc.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 illustrates a block diagram of one non-limiting embodiment of a disclosed computerized engineering tool 10. In one non-limiting embodiment, computerized engineering tool 10 may involve an integrated arrangement of respective modular functionalities (such as by way of respective user-interface modules) in a closed loop including a physics engine 14, a neural data editor 16, an experiment editor 18, a neural skills editor 20, and a machine learning environment 22.

In one non-limiting embodiment, physics engine 14 may be configured to generate a plurality of data primitives 24, such as may be indicative of 1) respective geometries of an object to be manipulated by the robotics system, and of manipulators (e.g., grippers) of the robotics system, 2) sensory perception of the object (such as RGB imagery, depth perception and plane segmentation) by imaging devices of the robotics system and any other sensors that may be involved (collectively represented by sensor data 25), and 3) one or more physical interactions by the robotics system with the object, such as forces, accelerations, velocities, impacts that may be involved as a robot 27 proceeds along a given trajectory 29 to perform a task.

In one non-limiting embodiment, neural data editor 16 may be configured to display an organized listing (e.g., hierarchically arranged) of user-selectable data elements 26 that form the data primitives generated by physics engine 14. In one non-limiting embodiment, one or more data sets of user-selected data elements 28 (such as exemplarily illustrated with check marks within neural data editor 16) of the organized listing of user-selectable data elements displayed by neural data editor 16 are inputted into experiment editor 18.

Without limitation, search functionality may be included in neural data editor 16 to assist a user to filter the listing of user-selectable data elements 26 according to, for example, name of data elements, type, and any other desired criteria that may be appropriately tailored based on the needs of a given application. For example, joint information may consist of a joint index (relative to a given robot), joint name, joint type (e.g., revolute, prismatic, spherical, planar, etc.), damping, friction, positional lower and upper limits, maximum force, maximum velocity, joint axis, parent frame, etc.). Additionally, each user-defined entity in physics engine 14 may be available in neural data editor 16. Non-limiting examples of user-defined entities may be trajectories, constraints, objects, etc. It will be appreciated that the listing of user-selectable data elements 26 is useful for a machine learning expert to select and export appropriate data elements that may be needed for the training of the neural skill.

In one non-limiting embodiment, the one or more data sets of user-selected data elements inputted into experiment editor 18 may be prepared with experiment editor 18 to obtain parameter data 30 for a desired experiment case. In one non-limiting embodiment, neural skills editor 20 may be configured to define a neural network 32, which when executed is subject to the parameter data prepared with experiment editor 18. For example, parameter data 30 may be prepared in experiment editor 18 to define respective input and output examples suitable for the defined neural network.

It will be appreciated that neural skills editor 20 can allow both graphical and/or programmatic approaches to define neural network 32, such as without limitation may include layer configuration and type, layer height, activation functions, optimizers, hyperparameters, etc., schematically represented by arrow 34. Neural skills editor 20 and experiment editor 18 may be concurrently used by the machine learning expert because of interdependencies between the data and the architecture of the neural network. For example, decisions made in connection with data to be extracted from any given designed experiment can have an impact on the neural network architecture, and vice-versa. To facilitate interactions with a user, engineering tool 10 may be configured to implement user-friendly views in connection with the various editors noted above. For example, if desired, the machine learning expert may configure experiment editor 18 and neural skills editor 20 to be displayed side-to-side on a common screen.

As would be appreciated by one skilled in the art, the various editors noted above, without limitation, may constitute hardware and/or software modules, which are "user-friendly" to the user. That is, not difficult to learn or understand. The following are non-limiting examples of user-friendly attributes that may be found in the disclosed editors.

Relatively simple to understand. That is, not overly complex, but straightforward, providing quick access to functional features and/or settings.

Graceful organization. That is, provide a well-organized "look and feel", making it easier to keep track of different options and setting conceptualizations.

Intuitive. That is, are designed to make logical sense to those skilled in the art and are further designed to involve non-burdensome explanation of how to interact with them.

Reliability. That is, such modules are expected to operate smoothly without causing undue frustration to the user.

In one non-limiting embodiment, machine learning environment 22 may be configured to execute the defined neural network with the parameter data prepared with experiment editor 18 in order to learn in machine learning environment 22 the neural skills that may be involved to implement at least parts of a control policy to control a sequence of tasks to be performed by a robot of a robotics system 50. The learning in machine learning environment 22 can be implemented by way of standard machine learning frameworks, which would be well-understood by those skilled in the art, such as Tensorflow, Keras, Pytorch, and other machine learning frameworks.

In one non-limiting embodiment, statistical properties 36 in connection with the neural skills being learned may be extracted from machine learning environment 22. In one non-limiting embodiment, an analyzer 38 may be configured to analyze the statistical properties 36 extracted from machine learning environment 22 to determine whether the learned neural skills fulfill desired objectives.

Without limitation, analyzer 38 may be configured to generate charts, statistics, and plots related to the performance of neural network 32, errors or warnings in connection with learning environment 22, and metrics selected to evaluate performance of the neural skills.

If, in on the one hand, analyzer 38 determines the neural skills learned in machine learning environment 22 fulfill the desired objectives, a skills composer 40 may be configured to compose programmed skills, such as comprising the learned neural skills and, optionally, hand-crafted skills that may be involved to implement at least further parts of the control policy.

In one non-limiting embodiment, a code generator 42 is responsive to the programmed skills composed by skills composer 40 to automatically generate computer-readable code 43 suitable for execution, for example, by a robotics controller 44 of robotics system 45 to implement the control policy.

Without limitation, skills composer 40 allows the robotics expert to efficiently obtain code for the neural skills and, optionally, combine such neural skills with traditional hand-crafted skills, if needed for a given application. Both hand-crafted and/or neural skills can be respectively composed to be expanded into relatively larger programs to create higher-level skills.

If, on the other hand, analyzer 38 determines the neural skills learned in machine learning environment 22 do not fulfill the desired objectives, at least one iteration may be performed in the closed loop to make at least one of the following adjustments: an adjustment by physics engine 14 to at least one of the plurality of data primitives, an adjustment by neural data editor 16 to a selection of respective data sets of user-selectable data elements displayed by neural data editor 16, an adjustment by experiment editor 18 to prepare adjusted parameter data for the desired experiment case, and an adjustment to the neural network defined in neural skills editor 20.

In one non-limiting embodiment, a meta-learning optimizer 60 may be coupled to computerized engineering tool 10. Meta-learning optimizer 60 may be configured to optimize at least one of the respective functionalities provided by the modules arranged in the closed loop. As will be appreciated by those skilled in the art, artificial intelligence (AI)-based systems can effectively master a relatively complex skill from scratch, using an understandably large amount of time and computation. But if one desires to develop multiple new skills and adapt such skills to diverse environments, then it may not be efficient to develop each new skill in each environment from scratch. Instead, it would be desirable to learn how to modify or optimize already developed tasks by appropriately tailoring previous experience or knowledge, rather than considering each new task in isolation. This is conceptually analogous to avoiding "reinvention of the wheel" in every instance but rather using meta-learning optimizer 60 to make appropriate use of previous experience or knowledge for developing new neural skills. This approach of learning to learn, or meta-learning, is a desirable feature towards providing effective versatility to computerized engineering tool 10 that can continually learn to optimize a wide variety of tasks based on previous experience or knowledge. For readers desirous of background information regarding some example meta-learning techniques, see article titled "Learning to Learn" by Chelsae Finn from Berkeley Artificial Intelligence Research, Jul. 18, 2017, which provides an introductory overview in plain English of various meta learning approaches.

Figure 2:
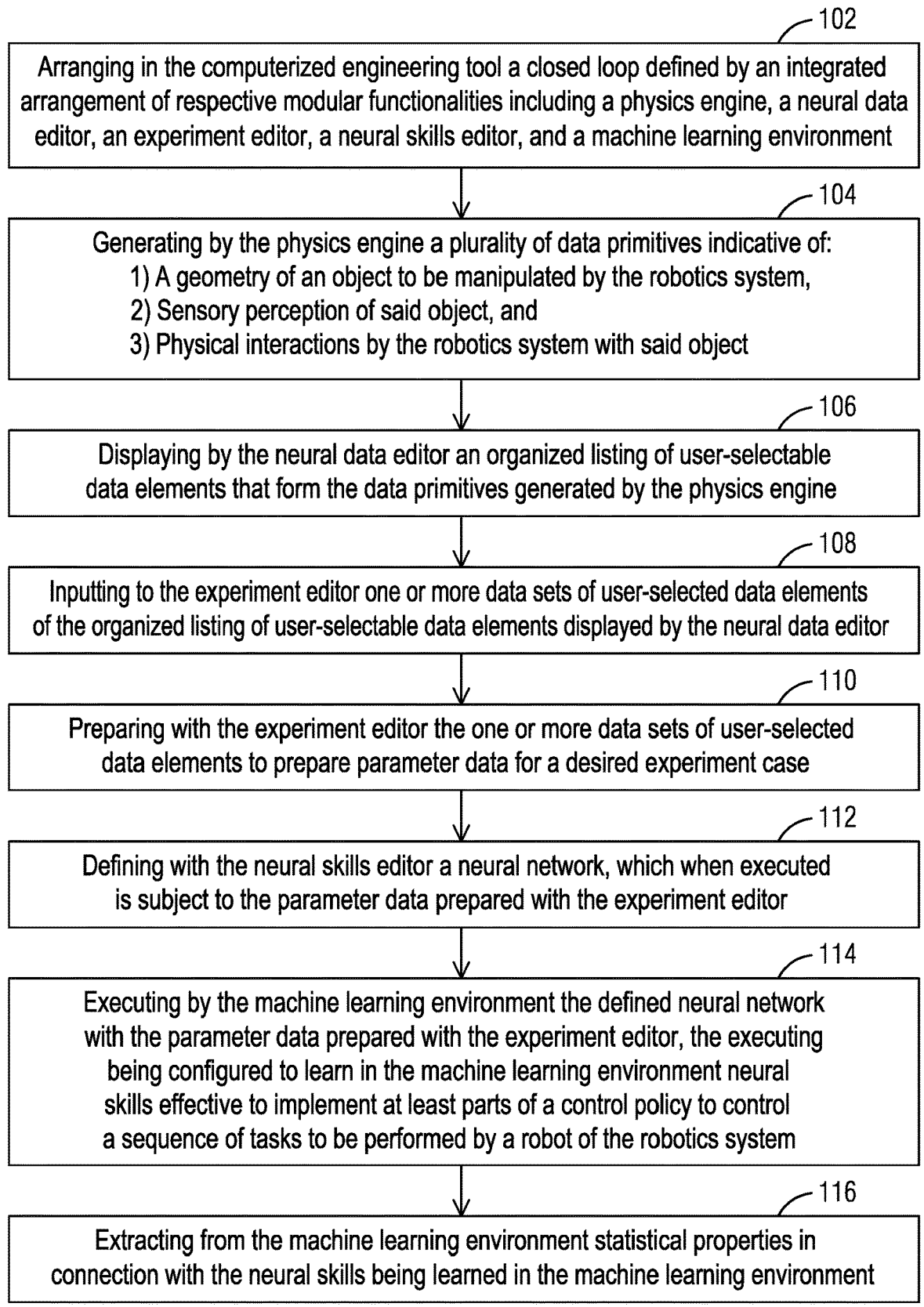
FIG. 2 illustrates a flow chart of one non-limiting embodiment of a disclosed methodology for developing neural skills for a robotics system.

FIG. 2 illustrates a flow chart of one non-limiting embodiment of a disclosed methodology to develop neural skills for a robotics system by way of a computerized engineering tool 10 (FIG. 1). Block 102 allows arranging in the computerized engineering tool a closed loop defined by an integrated arrangement of respective modular functionalities, (such as by way of respective user-interface modules) including a physics engine 14, a neural data editor 16, an experiment editor 18, a neural skills editor 20, and a machine learning environment 22, as discussed above in the context of FIG. 1.

Block 104 allows generating by physics engine 14 a plurality of data primitives 24 indicative of 1) respective geometries of an object to be manipulated by the robotics system, and of the robotics system, 2) sensory perception of the object, and 3) one or more physical interactions by the robotics system with the object.

Block 106 allows displaying by neural data editor 16 an organized listing of user-selectable data elements 26 that form the data primitives generated by physics engine 14. Block 108 allows inputting to experiment editor 18 one or more data sets of user-selected data elements of the organized listing of user-selectable data elements displayed by neural data editor 16.

Block 110 allows inputting to experiment editor 18 one or more data sets of user-selected data elements of the organized listing of user-selectable data elements displayed by neural data editor 16. Block 112 allows defining with neural skills editor 20 a neural network, which when executed is subject to the parameter data prepared with experiment editor 18.

Block 114 allows executing by machine learning environment 22 the defined neural network with the parameter data prepared with experiment editor 18. The executing by machine learning environment 22 being configured to learn neural skills effective to implement at least parts of a control policy to control a sequence of tasks to be performed by a robot of robotics system 50. Block 116 allows extracting from machine learning environment 22 statistical properties in connection with the neural skills being learned in machine learning environment 22.

The description below will proceed to describe further non-limiting aspects that may be performed in connection with the disclosed methodology to develop neural skills for a robotics system.

As shown in FIG. 3, block 122 allows analyzing by analyzer 38 of computerized engineering tool 10, the statistical properties extracted from machine learning environment 22. In one non-limiting embodiment, this analyzing may be configured to determine whether the learned neural skills fulfill desired objectives.

As shown in FIG. 4, if the analyzing determines the learned neural skills fulfill the desired objectives, block 132 allows using skills composer 40 to compose programmed skills, such as comprising the learned neural skills and, optionally, hand-crafted skills that may be configured to implement at least further parts of the control policy.

As shown in FIG. 5, block 142 allows inputting the programmed skills to code generator 42 configured to generate computer-readable code suitable for execution by robotics controller 44 of robotics system 50 to implement the control policy.

As shown in FIG. 6, if the analyzing determines the learned neural skills do not fulfill the desired objectives, block 152 allows performing at least one iteration in the closed loop to make at least one of the following adjustments: an adjustment by the physics engine to at least one of the plurality of data primitives, an adjustment by the neural data editor to a selecting of respective data sets of user-selectable data elements displayed by the neural data editor, an adjustment by the experiment editor to a preparing configured to prepare adjusted parameter data for the desired experiment case, and an adjustment to the defined neural network.

As shown in FIG. 7, block 162 allows coupling computerized engineering tool 10 to meta-learning optimizer 60, which may be configured to optimize at least one of the respective functionalities by the integrated arrangement of modules.

In operation disclosed embodiments realize appropriate improvements for more effectively developing neural skills. Without limitation, disclosed embodiments are effective for developing neural skills that may be used for continuous, automated robotics control. By way of example, the learned neural skills may be effective to implement interactive control of the robot and may include relatively difficult to model interactions, such as may involve frictional, contact and impact interactions, that, for example, may be experienced by joints (e.g., grippers) of the robot while performing a respective task of the sequence of tasks.

Disclosed embodiments are believed to be conducive to widespread and flexible applicability of machine learned networks for industrial automation and control that may involve automated robotics control. For example, disclosed embodiments are conducive to simplifying development efforts involving neural skills, e.g., reducing the time involved to develop the neural skills involved in any given robotics system. Disclosed embodiments are further conducive to reducing the level of expertise involved to develop neural skills.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A method to develop neural skills for a robotics system by way of a computerized engineering tool, the method comprising:
    arranging in the computerized engineering tool a closed loop including an integrated arrangement of respective modular functionalities comprising a physics engine, a neural data editor, an experiment editor, a neural skills editor, and a machine learning environment;
    generating by the physics engine a plurality of data primitives indicative of 1) respective geometries of an object to be manipulated by the robotics system, and of the robotics system, 2) sensory perception of said object, and 3) one or more physical interactions by the robotics system with said object;
    displaying by the neural data editor an organized listing of user-selectable data elements that form the data primitives generated by the physics engine;
    inputting to the experiment editor one or more data sets of user-selected data elements of the organized listing of user-selectable data elements displayed by the neural data editor;
    preparing with the experiment editor the one or more data sets of user-selected data elements to prepare parameter data for a desired experiment case;
    defining with the neural skills editor a neural network, which when executed is subject to the parameter data prepared with the experiment editor;
    executing by the machine learning environment the defined neural network with the parameter data prepared with the experiment editor, the executing being configured to learn in the machine learning environment neural skills effective to implement at least parts of a control policy to control a sequence of tasks to be performed by a robot of the robotics system; and
    extracting from the machine learning environment statistical properties in connection with the neural skills being learned in the machine learning environment.

2. The method to develop neural skills of claim 1, further comprising analyzing by an analyzer of the computerized engineering tool, the statistical properties extracted from the machine learning environment, the analyzing configured to determine whether the learned neural skills fulfill desired objectives.

3. The method to develop neural skills of claim 2, further comprising composing by a skills composer programmed skills comprising the learned neural skills in response to the analyzing by the analyzer determining the learned neural skills fulfill the desired objectives.

4. The method to develop neural skills of claim 3, wherein the programmed skills by the skills composer further comprise hand-crafted skills configured to implement at least further parts of the control policy.

5. The method to develop neural skills of claim 4, further comprising inputting the programmed skills to a code generator configured to generate computer-readable code suitable for execution by a robotics controller of the robotics system to implement the control policy.

6. The method to develop neural skills of claim 2, further comprising, in response to the analyzing by the analyzer determining the learned neural skills do not fulfill the desired objectives, performing at least one iteration in the closed loop to make at least one of the following adjustments:
    an adjustment by the physics engine to at least one of the plurality of data primitives, an adjustment by the neural data editor to a selecting of respective data sets of user-selectable data elements displayed by the neural data editor, an adjustment by the experiment editor to a preparing configured to prepare adjusted parameter data for the desired experiment case, and an adjustment by the neural skills editor to the defined neural network.

7. The method to develop neural skills of claim 1, further comprising coupling the computerized engineering tool to a meta-learning optimizer, which is configured to optimize at least one of the respective functionalities by the integrated arrangement of respective modular functionalities.

8. A computerized engineering tool to develop neural skills for a robotics system, the computerized engineering tool comprising:
    an integrated arrangement of respective modular functionalities in a closed loop including a physics engine, a neural data editor, an experiment editor, a neural skills editor, and a machine learning environment, wherein the physics engine is configured to generate a plurality of data primitives indicative of 1) respective geometries of an object to be manipulated by the robotics system, and of manipulators of the robotics system, 2) sensory perception of said object, and 3) one or more physical interactions by the robotics system with said object, wherein the neural data editor is configured to display an organized listing of user-selectable data elements that form the data primitives generated by the physics engine;

wherein one or more data sets of user-selected data elements of the organized listing of user-selectable data elements displayed by the neural data editor are inputted into the experiment editor;

wherein the one or more data sets of user-selected data elements are prepared with the experiment editor to obtain parameter data for a desired experiment case;

wherein the neural skills editor is configured to define a neural network, which when executed is subject to the parameter data prepared with the experiment editor, wherein the machine learning environment is configured to execute the defined neural network with the parameter data prepared with the experiment editor, in order to learn in the machine learning environment neural skills effective to implement at least parts of a control policy to control a sequence of tasks to be performed by a robot of the robotics system; and wherein statistical properties in connection with the neural skills being learned are extracted from the machine learning environment.

9. The computerized engineering tool of claim 8, further comprising an analyzer configured to analyze the statistical properties extracted from the machine learning environment to determine whether the learned neural skills fulfill desired objectives.

10. The computerized engineering tool of claim 9, further comprising a skills composer configured to compose programmed skills comprising the learned neural skills in response to the analyzer determining the learned neural skills fulfill the desired objectives.

11. The computerized engineering tool of claim 10, wherein the programmed skills by the skills composer further comprise hand-crafted skills configured to implement at least further parts of the control policy.

12. The computerized engineering tool of claim 11, further comprising a code generator responsive to the programmed skills to generate computer-readable code suitable for execution by a robotics controller of the robotics system to implement the control policy.

13. The computerized engineering tool of claim 9, wherein, in response to the analyzer determining the learned neural skills do not fulfill the desired objectives, the computerized engineering tool configured to perform at least one iteration in the closed loop to make at least one of the following adjustments:

an adjustment by the physics engine to at least one of the plurality of data primitives, an adjustment by the neural data editor to a selecting of respective data sets of user-selectable data elements displayed by the neural data editor, an adjustment by the experiment editor to prepare adjusted parameter data for the desired experiment case, and an adjustment by the neural skills editor to the defined neural network.

14. The computerized engineering tool of claim 8, wherein a meta-learning optimizer is coupled to the computerized engineering tool, the meta-learning optimizer configured to optimize at least one of the respective functionalities by the integrated arrangement of respective modular functionalities.

* * * * *